United States Patent [19]
Flick

[11] Patent Number: 6,049,268
[45] Date of Patent: Apr. 11, 2000

[54] VEHICLE REMOTE CONTROL SYSTEM WITH LESS INTRUSIVE AUDIBLE SIGNALS AND ASSOCIATED METHODS

[76] Inventor: Kenneth E. Flick, 5236 Presley Pl., Douglasville, Ga. 30135

[21] Appl. No.: 09/366,519

[22] Filed: Aug. 3, 1999

[51] Int. Cl.$^7$ ...................................................... B60Q 1/00
[52] U.S. Cl. ................. 340/425.5; 340/426; 340/825.69; 340/692; 381/302; 381/104; 381/105; 381/109
[58] Field of Search ................................ 340/425.5, 426, 340/825.69, 692, 691.3; 381/302, 56, 86, 104, 105, 107, 109

[56] References Cited

U.S. PATENT DOCUMENTS

| | | | |
|---|---|---|---|
| 4,383,242 | 5/1983 | Sassover et al. | 340/64 |
| 4,996,515 | 2/1991 | Schaffer et al. | 340/426 |
| 5,146,215 | 9/1992 | Drori | 340/825.32 |
| 5,534,845 | 7/1996 | Issa et al. | 340/425.5 |
| 5,572,185 | 11/1996 | Chen et al. | 340/425.5 |
| 5,663,704 | 9/1997 | Allen et al. | 340/426 |
| 5,673,017 | 9/1997 | Dery et al. | 340/426 |
| 5,677,664 | 10/1997 | Sawinski | 340/426 |
| 5,793,306 | 8/1998 | Vershinin et al. | 340/825.69 |

Primary Examiner—Daniel J. Wu
Assistant Examiner—Tai Tan Nguyen
Attorney, Agent, or Firm—Allen, Dyer, Doppelt, Milbrath & Gilchrist, P.A.

[57] ABSTRACT

A vehicle remote control system includes a remote transmitter to be carried by a user, a receiver at the vehicle for receiving signals from the remote transmitter, an audible signal generator at the vehicle, and a controller connected to the receiver and being operable in response to a received signal. Moreover, the controller is also preferably connected to the audible signal generator for causing generation of an audible signal based upon a received signal, and wherein the audible signal has at least one characteristic based on the transmission distance so that the audible signal is less intrusive for a shorter transmission distance. For example, the controller may determine the transmission distance based upon the received signal strength. In addition, the at least one characteristic may comprise one or more of a volume, duration, or frequency of the audible signal. The audible signal generation may be used for a vehicle security system, a remote keyless entry system, and/or a remote start system.

44 Claims, 5 Drawing Sheets

VEHICLE REMOTE CONTROL SYSTEM WITH LESS INTRUSIVE AUDIBLE SIGNALS AND ASSOCIATED METHODS

FIELD OF THE INVENTION

The invention relates to the field of vehicle remote control systems, and more particularly, to a vehicle security or convenience system operable from a remote transmitter.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. The remote transmitter may be used to arm and disarm the vehicle security system or provide other remote control features from a predetermined range away from the vehicle.

A typical vehicle security system issues one or more audible "chirps" to confirm certain operations to the user. For example, when a user leaves his vehicle and presses the arm button on the remote transmitter, the vehicle controller will typically cause a siren or horn to sound one or more chirps. The chirps confirm that the user has properly armed the vehicle. Similarly, upon returning to the vehicle, the user may press a disarm button on the remote transmitter and two chirps are sounded, thereby indicating that the vehicle security system has been disarmed.

Unfortunately, although the chirps serve a useful purpose to the vehicle owner, the chirps may be intrusive to others in the area. This is especially so since the pattern of chirps is typically generated by the horn or siren at the full power of the alarm indication, but for a reduced duration. This disadvantage becomes more prominent as areas become more highly populated, and more and more vehicles have security systems.

U.S. Pat. No. 5,534,845 to Issa et al. discloses a vehicle security system where the chirps may be turned completely off, and a visual only indication is provided to confirm that a command has been received from the remote transmitter. In other words, this patent describes a chirp elimination feature to avoid the annoyance or nuisance as may be caused by full volume confirmation chirps from a vehicle security system.

Yet another approach to the potential annoyance caused by confirmation chirps is provided by allowing the user to select a reduced volume or "soft chirp" for confirmation signals. A vehicle security system including such a soft chirp feature is disclosed, for example, in U.S. Pat. No. 5,572,185 to Chen et al.

The drawbacks with the visual only confirmation signals and soft chirp signals is that the user may not be assured that the desired command signal has been received by the vehicle security system, and carried out. The user may not see a visual only confirmation signal depending on other potentially intervening objects and/or the distance from the vehicle. The soft chirp may not be heard if the distance to the user is too far or ambient noise is too great. Accordingly, neither the visual only or soft chirp approaches are wholly satisfactory from the user's perspective. Indeed, since the user may repeatedly activate the remote transmitter if he cannot see or hear confirmation, the visual only and soft chirp features may lead to more annoyance than a conventional system producing full volume chirp confirmation signals.

SUMMARY OF THE INVENTION

In view of the foregoing background, it is therefore an object of the present invention to provide a vehicle remote control system and related methods wherein audible confirmation signals are provided to a user while reducing the intrusive effects on others.

This and other objects, features and advantages in accordance with the present invention are provided by a vehicle remote control system comprising a remote transmitter to be carried by a user, and a controller and associated receiver at the vehicle and being operable in response to received signals from the remote transmitter. Moreover, the controller also causes an audible generator at the vehicle to generate an audible signal having at least one characteristic so that the audible signal is less intrusive for a higher received signal strength. The higher received signal strength corresponds to a shorter transmission distance between the remote transmitter and the receiver.

The at least one characteristic of the audible signal may comprise one or more of a volume, duration, or frequency of the audible signal. For example, the volume would be lower for a shorter transmission distance. Similarly, the duration of the audible signal is less for a shorter transmission distance. And, as relates to frequency as the characteristic of the audible signal, the frequency is desirably lower for a shorter transmission distance. Accordingly, the user is assured of receiving the audible signal, but with minimum disruption or intrusion to others. Of course, the user need not repeat attempts to operate the controller, since confirmation is very likely to be heard by the user in accordance with the invention.

The audible signal may be generated in response to receiving a signal from the remote transmitter at the receiver in the vehicle so that the audible signal serves as confirmation of receipt of the signal from the remote transmitter. Alternately or additionally, the audible signal may be responsive to performance of the desired or commanded operation of the controller. In other words, the audible signal is a confirmation signal that the operation has been performed.

The controller may establish a plurality of discrete values of the at least one characteristic of the audible signal based upon the received signal strength. The controller may also permit selection of at least one default value of the characteristic.

The vehicle remote control system may be a vehicle security system, in which case, the controller is switchable between armed and disarmed modes responsive to respective arm and disarm signals from the remote transmitter. The invention is also applicable to a remote keyless entry systems. In particular, the controller may generate door lock and unlock signals responsive to respective lock and unlock signals from the remote transmitter. The invention may also be applied to a remote engine start control system, wherein the controller causes the engine to start responsive to receiving a remote start signal from the remote transmitter.

The audible signal generator may comprise a horn, a siren, and/or a loudspeaker, for example. The remote transmitter preferably comprises a radio frequency (RF) remote transmitter and the receiver in the vehicle is preferably an RF receiver.

A method aspect of the invention is for operating a vehicle remote control system while reducing the intrusiveness thereof. The vehicle remote control system preferably comprises a remote transmitter to be carried by a user, a receiver at the vehicle for receiving signals from the remote transmitter with each received signal having a received signal strength corresponding to a transmission distance from the remote transmitter to the receiver, a controller connected to the receiver and being operable in response to received signals from the remote transmitter, and an audible signal generator at the vehicle and connected to the controller. The method preferably comprises the steps of: operating the controller responsive to received signals from the remote transmitter, and causing the audible signal generator to generate an audible signal having at least one characteristic so that the audible signal is less intrusive for a higher received signal strength corresponding to a shorter transmission distance between the remote transmitter and the receiver. The characteristic may be one or more of the volume, duration, and frequency of the audible signal.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
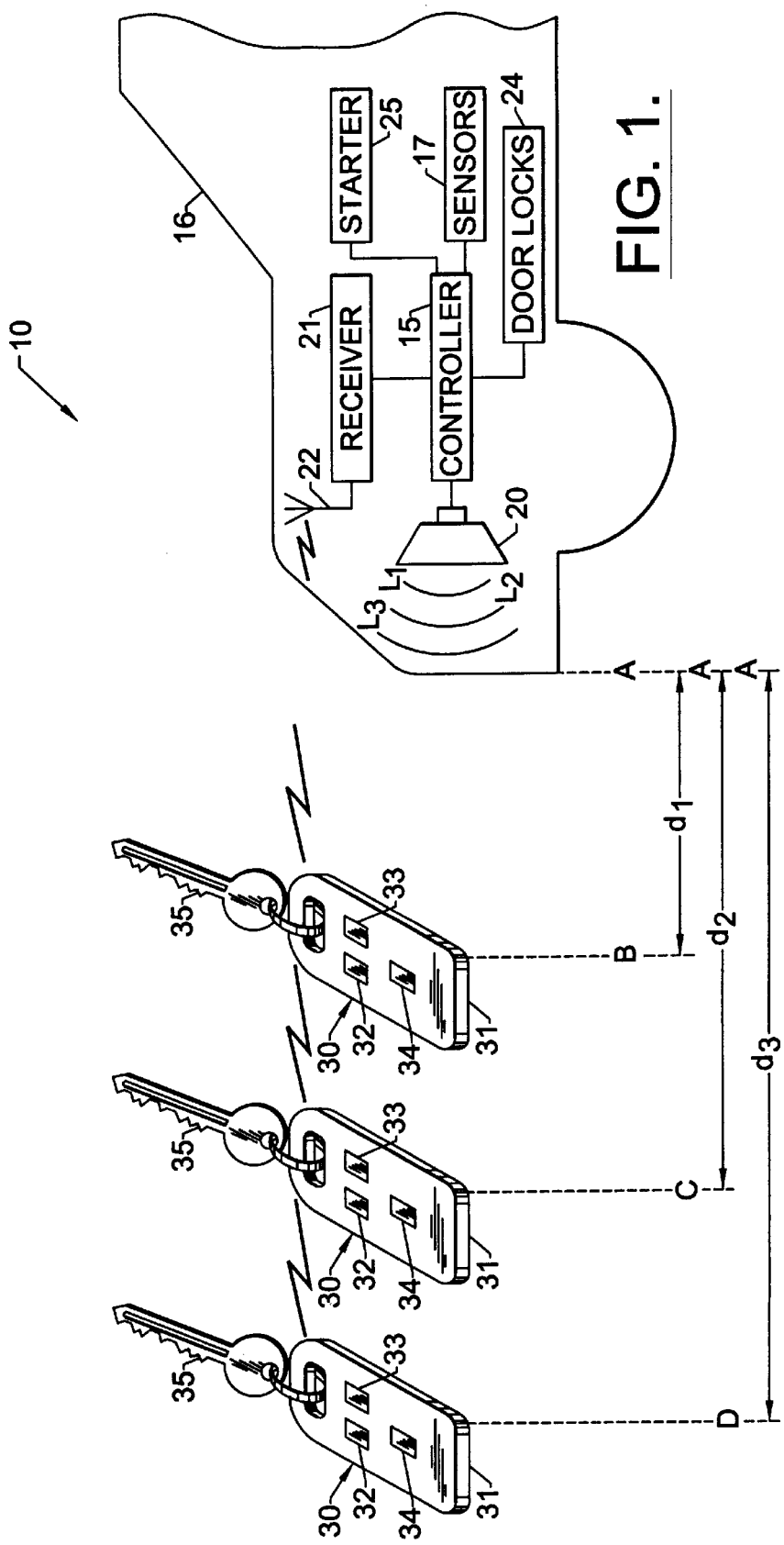
FIG. 1 is a schematic diagram of a vehicle remote control system in accordance with the present invention illustrating multiple transmissions from different distances.
Figure 2:
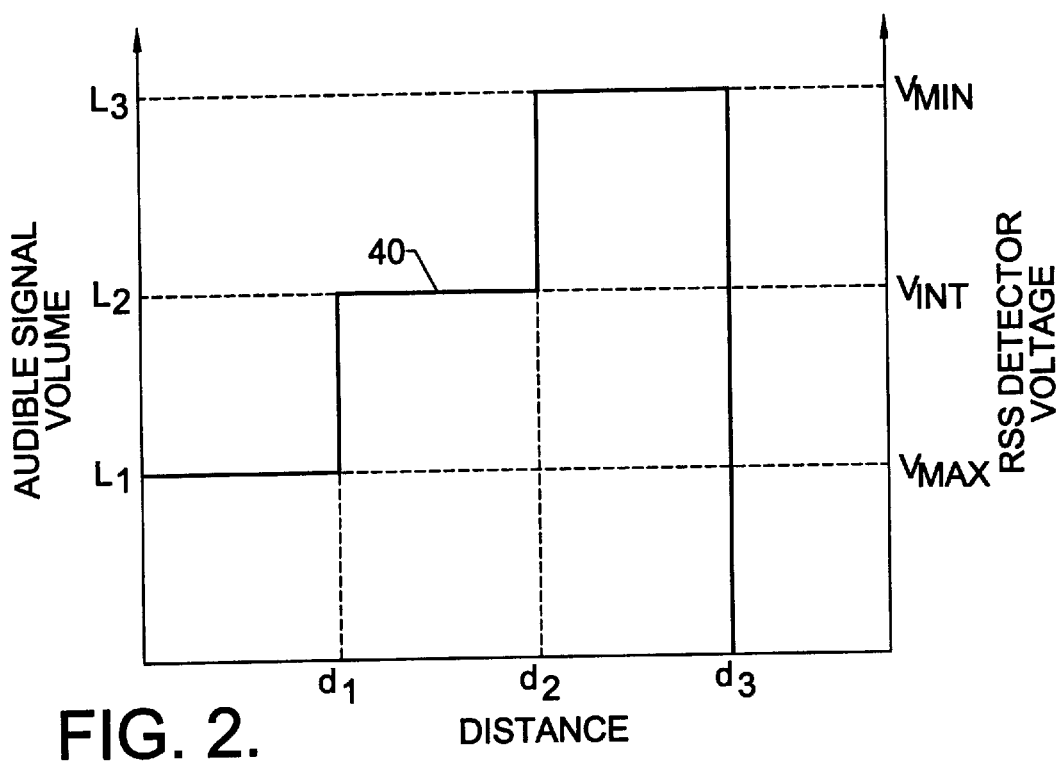
FIG. 2 is a plot of audible signal volume versus transmission distance for the vehicle remote control system in accordance with a first embodiment of the invention wherein the volume varies in discrete steps versus distance.

Referring initially to FIGS. 1–2 the general components and operation of a vehicle control system 10 are described. The illustrated vehicle control system 10 includes a controller 15 mounted in the vehicle 16. The controller 15 may be a security system controller that is connected to the schematically illustrated vehicle sensors 17 and which is typically switchable between armed and disarmed modes. As would be readily understood by those skilled in the art, the sensors 17 may include door, hood, and/or trunk pin switches, or motion sensors, for example. Other sensors may also be included, such as for determining the position of the ignition switch, etc., as will also be readily understood by those skilled in the art.

The controller 15 is also illustratively connected to an audible signal generator 20, such as the vehicle horn, siren, or loudspeaker. The audible signal generator 20 may include associated electronic circuitry for generating a desired audible signal, or the electrical signal may be generated in the controller 15 and passed to the audible signal generator 20 as will be readily appreciated by those skilled in the art.

The audible signal generator 20 may be triggered by the controller 15 detecting that a vehicle sensor 17 has been triggered while the controller was in an armed mode, for example. Additionally, an audible signal is also typically generated as confirmation that a radio frequency RF signal has been received by the receiver 21 and its associated antenna 22 from a remote transmitter 30, such as switching between armed and disarmed modes, for example. The receiver 21 and controller 15 may be contained within a single housing, not shown. In addition, the antenna 22 may be a wire antenna extending from the housing or may be a remote antenna positioned in the window area of the vehicle 16.

The remote transmitter 30 is for carrying by the user to perform certain functions remote from the vehicle 16. The remote transmitter 30 includes a housing 31 which contains the electronics and battery, not shown, for RF transmission of commands to the receiver 21 as will be readily appreciated by those skilled in the art. A plurality of push button switches 32–34 are illustratively carried by the housing 31, as is one or more vehicle ignition keys 35 as will also be understood by those skilled in the art. For example, a single audible chirp may indicate that the controller 15 has been switched to the armed mode. Two sequential chirps may indicate that the controller 15 has ben switched to the disarmed mode.

As described so far, the controller 15 is primarily directed to vehicle security functions. Those of skill in the art will appreciate that the controller 15 may alternately be a more simplified remote keyless entry controller which is connected to the door locks 24, but which does not provide an alarm function. Alternately, the controller 15 may be for performing remote starting of the vehicle engine via the schematically illustrated starter circuit 25. In any of these variations, it may also be desirable to ensure that the vehicle user is aware that an RF transmission has been received at the vehicle and the command performed. Accordingly, remote keyless entry and remote starting may also benefit from an audible confirmation signal from the vehicle. While it is desirable to enable the user to receive confirmation, the intrusiveness of the audible confirmation signal is desirably reduced in accordance with the present invention.

As shown in the lower portion of FIG. 1, the user may be at various points B, C and D from the position of the vehicle at point A. These points define progressively increasing respective distances d1, d2 and d3 for the transmission of the RF signal from the remote transmitter 30. These distances d1, d2 and d3 also affect the ability of the user to perceive the audible signals generated at the vehicle 16 by the audible signal generator 20 as will be appreciated by those skilled in the art.

In accordance with the present invention, the controller 15 causes the audible signal generator 20 at the vehicle 16 to generate an audible signal having at least one characteristic so that the audible signal is less intrusive for a higher received signal strength (RSS). The higher RSS corresponds to a shorter transmission distance between the remote transmitter and the receiver as will be appreciated by those skilled in the art. The at least one characteristic of the audible signal may comprise one or more of a volume, duration, or frequency of the audible signal. For example, the volume would be lower for a shorter transmission distance. Similarly, the duration of the audible signal is shorter for a shorter transmission distance. And, as relates to frequency as the characteristic of the audible signal, the frequency is desirably lower for a shorter transmission distance. Accordingly, the user is assured of receiving the audible signal, but with minimum disruption or intrusion to others. The user need not repeat attempts to operate the controller 15, since confirmation is very likely to be heard by the user in accordance with the invention.

The audible signal may be generated in response to receiving a signal from the remote transmitter 30 at the receiver 21 in the vehicle 16 so that the audible signal serves as confirmation of receipt of the signal from the remote transmitter. Alternately or additionally, the audible signal may be responsive to performance of the desired or commanded operation of the controller 15. In other words, the audible signal typically serves as the confirmation signal that the operation has been performed.

The controller 15 may establish a plurality of discrete values of the at least one characteristic of the audible signal based upon the RSS as shown by the staircase plot 40 in FIG. 2. For each distance d1, d2 and d3, a corresponding RSS value, such as measured in volts from the output of an RF detector in the receiver 21, is, in turn, correlated to a volume or loudness value of the audible signal generator 20. For example, the RSS voltages Vmax, Vint and Vmin correspond to volume values L1, L2 and L3, respectively. Of course, more than three or only two discrete volume levels or values could be implemented as will be readily appreciated by those skilled in the art. In addition, although the values are plotted as a staircase linear function of distance, as are the RSS values, those of skill in the art will recognize that the relationships may include logarithmic or other non-linear portions.

The controller 15 may also desirably permit selection of at least one default value of the characteristic, such as the volume. Accordingly, the user could set the range of volume levels by setting a baseline minimum volume L1, for example, determined based upon the particular configuration of the vehicle and its audible signal generator 20, the ambient noise conditions most often encountered, and/or the transmission/reception characteristics of the remote transmitter 30 and the receiver 21 as will be readily appreciated by those skilled in the art.

Figure 3:
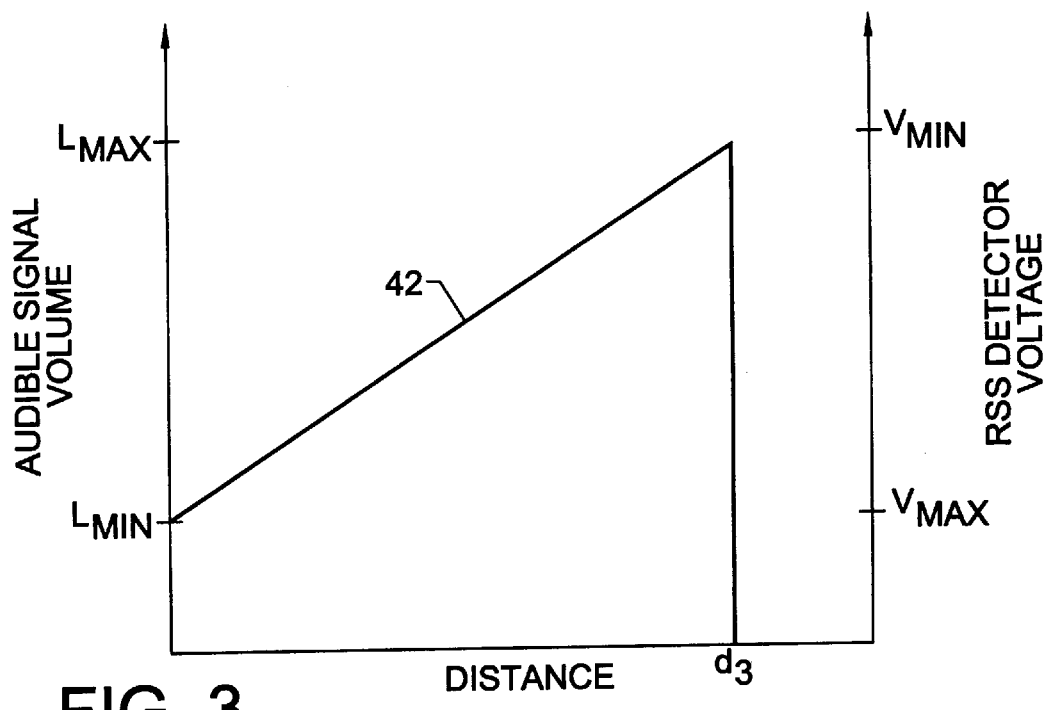
FIG. 3 is a plot of audible signal volume versus transmission distance for the vehicle remote control system in accordance with a second embodiment of the invention wherein the volume varies continuously versus distance.

Turning to the plot 42 of FIG. 3, another embodiment of the system 10 is now described. In this embodiment, the relationship between distance and volume is continuous, rather than in discrete steps as in the plot 40 of FIG. 2. The volume level can vary between a minimum level Lmin and a maximum level Lmax as the RSS varies between maximum and minimum values Vmax and Vmin as will be readily appreciated by those skilled in the art.

Figure 4:
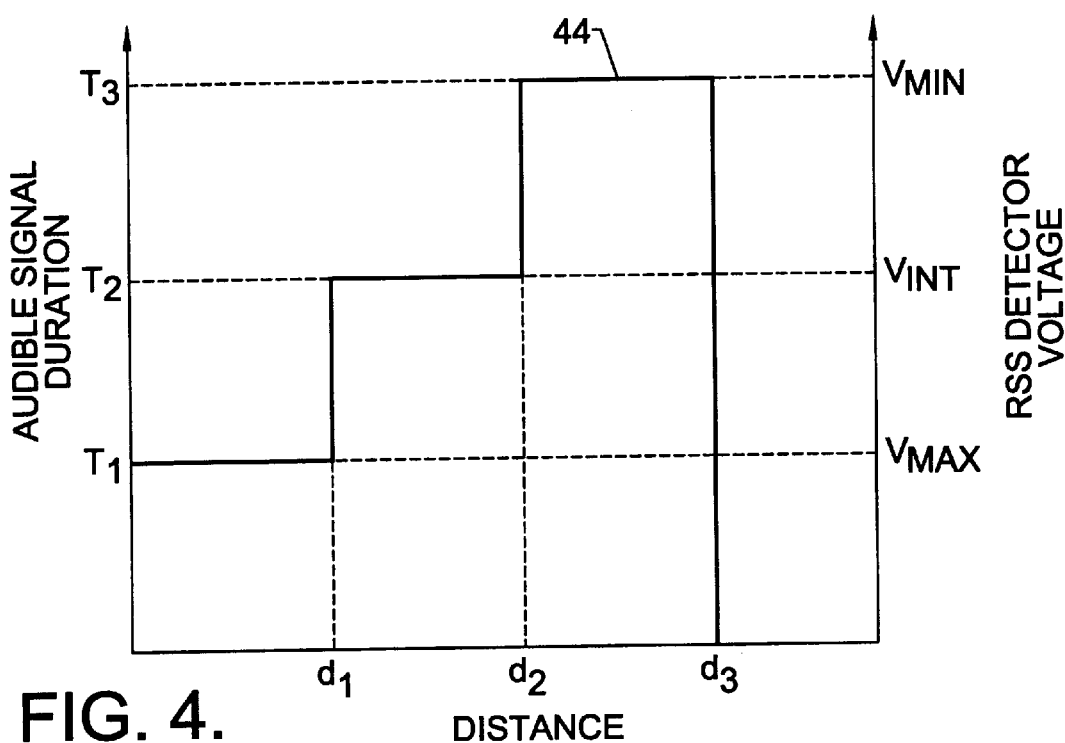
FIG. 4 is a plot of audible signal duration versus transmission distance for the vehicle remote control system in accordance with a third embodiment of the invention wherein the duration varies in discrete steps versus distance.
Figure 5:
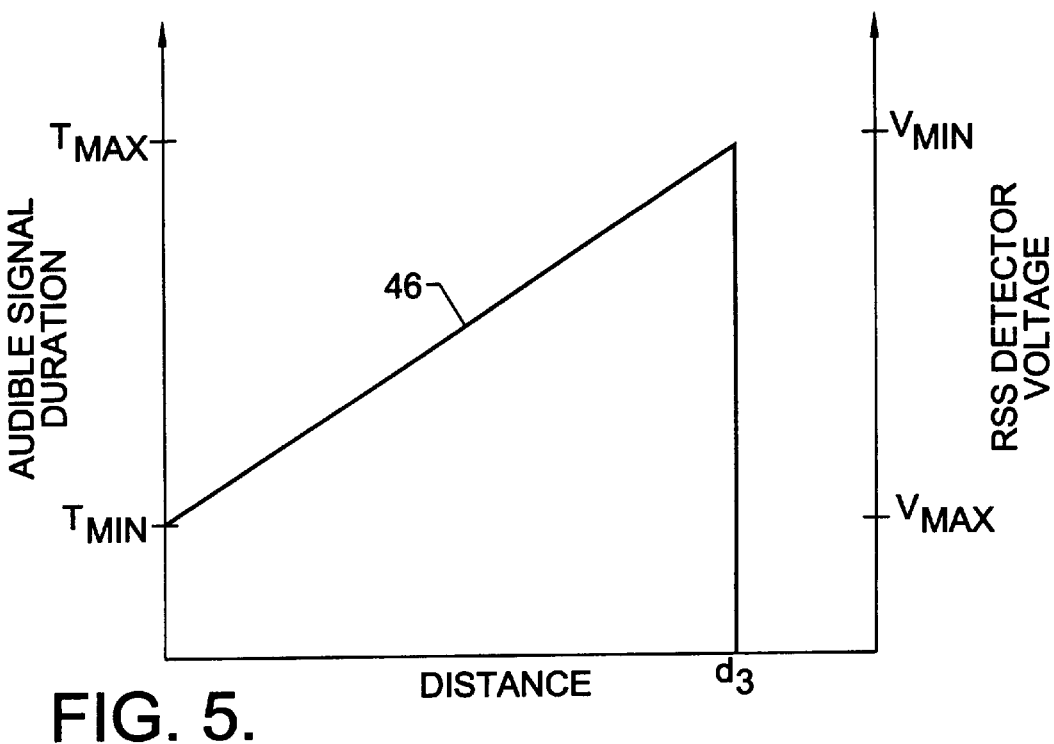
FIG. 5 is a plot of audible signal volume versus transmission distance for the vehicle remote control system in accordance with a fourth embodiment of the invention wherein the duration varies continuously versus distance.

Another characteristic that can be varied based upon the transmission distance is the duration of the audible signal. More particularly, the duration can be varied in discrete steps as indicated by the plot 44 of FIG. 4. Alternately, the time duration can be varied in a continuous fashion as illustrated by the plot 46 of FIG. 5. Again, the concept is that disruption or intrusion can be reduced while still permitting the user to recognize or perceive that the signal has been received at the vehicle 16. As will be readily appreciated by those skilled in the art, the audible signal may comprises a series of short bursts or chirps, and by reducing the time duration is meant to cover either or both of reducing the time duration of each chirp or the total time duration of a series of chirps by reducing the number of such chirps. In many instances, however, reducing the number of chirps may be undesirable because the user recognizes receipt of a given command by the number of chirps.

Figure 6:
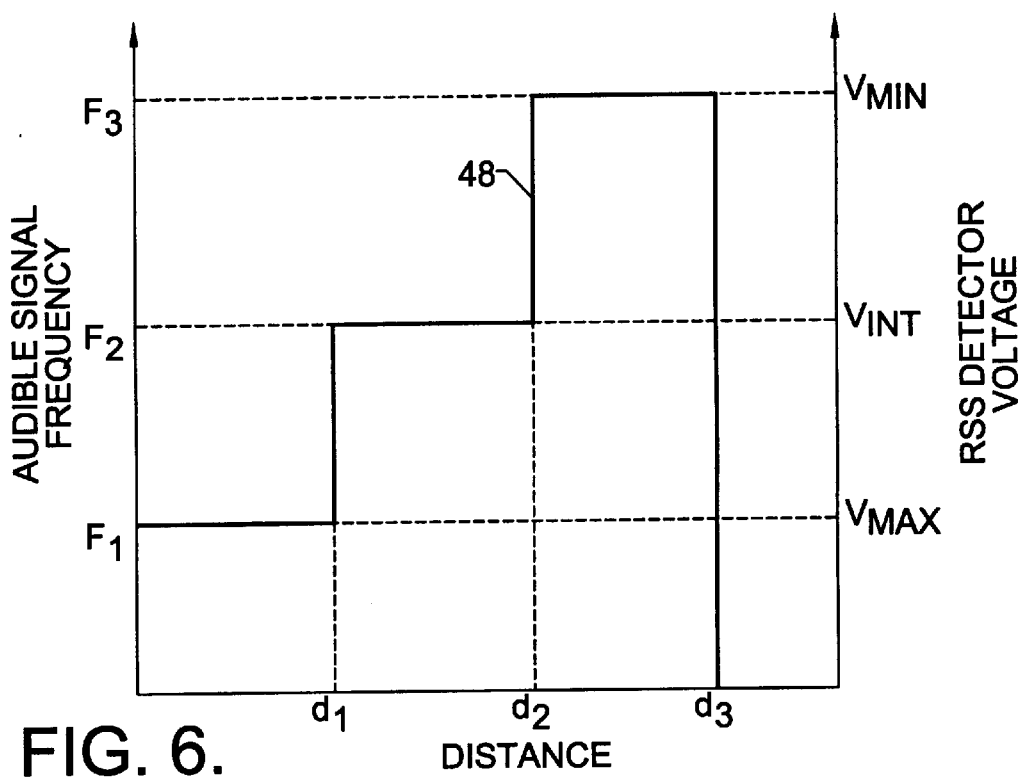
FIG. 6 is a plot of audible signal frequency versus transmission distance for the vehicle remote control system in accordance with a fifth embodiment of the invention wherein the duration varies in discrete steps versus distance.
Figure 7:
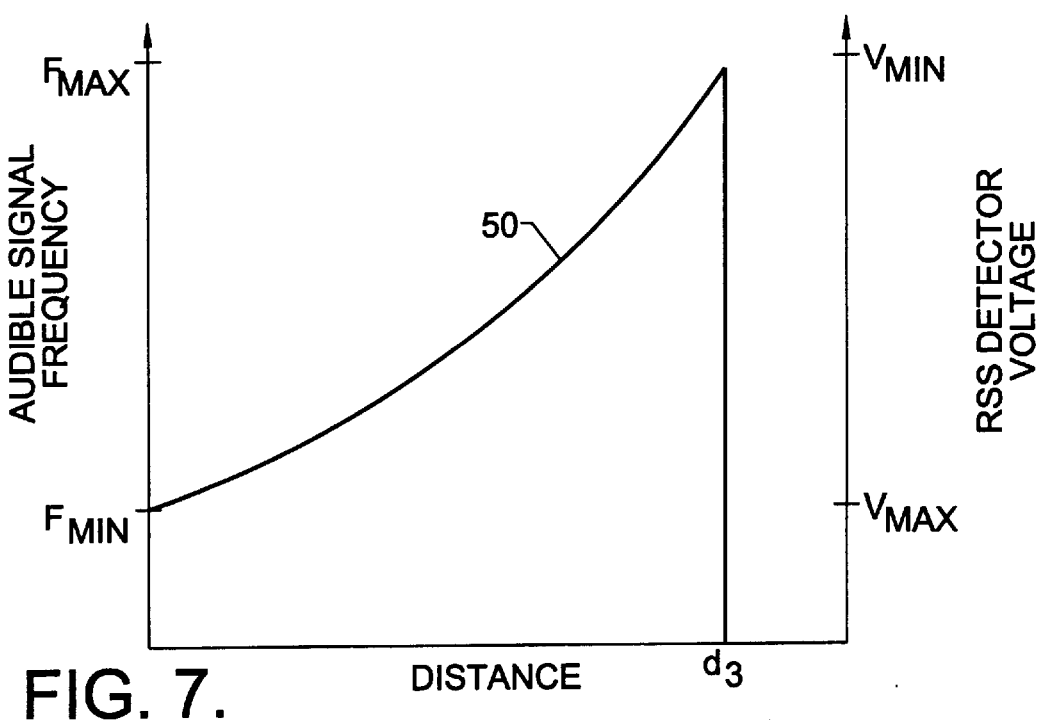
FIG. 7 is a plot of audible signal frequency versus transmission distance for the vehicle remote control system in accordance with a sixth embodiment of the invention wherein the duration varies continuously versus distance.

Turning now additionally to the plots 48, 50 of FIGS. 6 and 7, respectively, yet further embodiments of the invention are described. In the embodiment of FIG. 6, the frequency of the audible signal is varied based upon the distance. This embodiment also illustrates that the steps need not be in identical size; rather, each step may be slightly larger than its predecessor.

In the embodiment of FIG. 7, the frequency is varied continuously based upon the RSS signal from the receiver detector. In this embodiment, the frequency increases according to a parabolic function, although those of skill in the art will appreciate that other functions, both linear and non-linear, are also contemplated by the invention.

Having now described in detail three characteristics, namely, volume, duration, and frequency which can be reduced to thereby lessen the intrusiveness of the audible signal, those of skill in the art will appreciate that other characteristics and combinations thereof may also be intentionally varied or controlled based upon distance. In addition, the values may be based upon peak or averages over a given time interval.

A representative implementation for a siren as the audible signal generator 20 is as follows. If the RSS is greater than 3 volts at the output of the receiver detector indicating that the user is near the vehicle, a 150 msec signal is produced. If the RSS is between 3 and 2 volts, for example, the chirp time is increased to 200 msec. If the RSS detector voltage is between 2 and 1 volt, the chirp may be 250 msec. If the RSS voltage is between 1 and 0.5 volts, the chirp time is 350 msec; and, if the RSS voltage is less than 0.5 volts, then the chirp time is 450 msec.

For a conventional vehicle horn which produces different sounds than a siren, a chirp for greater than 3 volts RSS value may desirably have a duration of 8 msec. For an RSS voltage of between 3 and 2 volts, the chirp may be 11 msec. Continuing, for an RSS voltage between 2 and 1 volts, the horn chirp may be 12 msec. For an RSS voltage of between 1 and 0.5 volts, the chirp may be 13 msec. For an RSS voltage of less than 0.5 volts, the chirp may be 14 msec. Of course, those skilled in the art will appreciate that other values may also be used for the embodiment where the time duration is varied in accordance with distance, and similar functions can be established for controlling volume or frequency. In addition, adjusting the chirp duration may also effect the perceived volume level in addition to the duration.

A method aspect of the invention is for operating a vehicle remote control system 10 while reducing the intrusiveness thereof. The vehicle remote control system 10 preferably comprises a remote transmitter 30 to be carried by a user, a receiver 21 at the vehicle 16 for receiving signals from the remote transmitter with each received signal having an RSS corresponding to a transmission distance from the remote transmitter to the receiver, a controller 15 connected to the receiver and being operable in response to received signals from the remote transmitter, and an audible signal generator 20 at the vehicle and connected to the controller. The method preferably comprises the steps of: operating the controller 15 responsive to received signals from the remote transmitter 30, and causing the audible signal generator 20 to generate an audible signal having at least one characteristic so that the audible signal is less intrusive for a higher RSS corresponding to a shorter transmission distance between the remote transmitter and the receiver. As mentioned above, the characteristic may be one or more of the volume, duration, and frequency of the audible signal.

Figure 8:
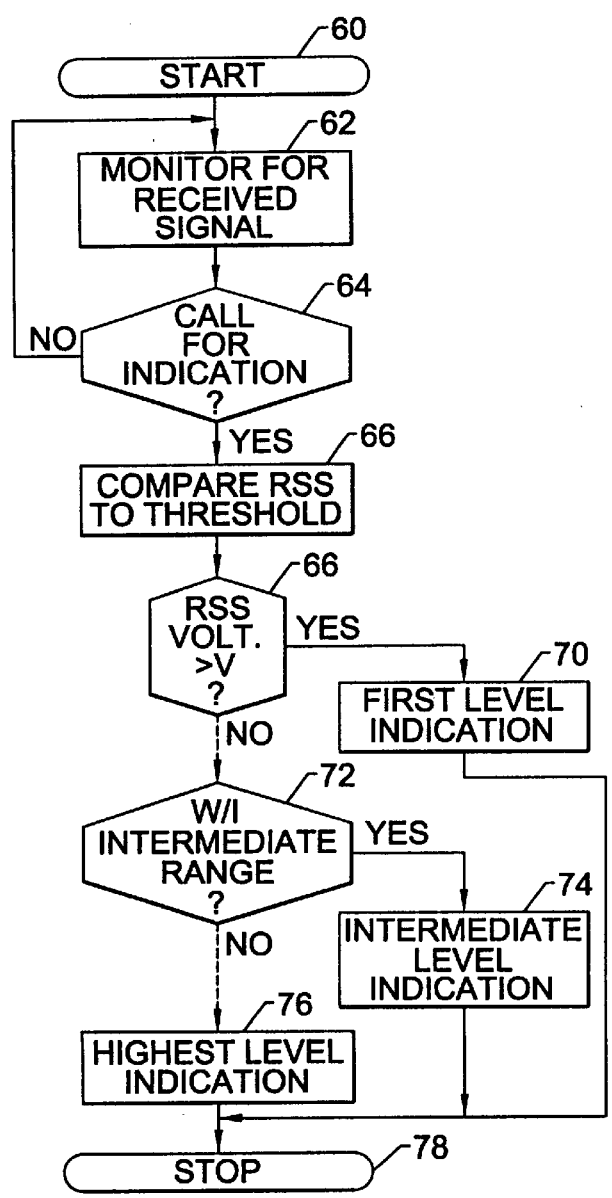
FIG. 8 is a flowchart for a method of a discrete level audible signal indication embodiment of the present invention.

Turning now to the flowchart of FIG. 8, an method embodiment of the invention is now further described. From the start (Block 60) the receiver 21 is monitored for a received RF signal from the remote transmitter 30 at Block 62. If an RF signal is received and the signal calls for a response from the controller 15 as determined at Block 64, the RSS voltage is compared to thresholds at Block 66. At Block 68 it is determined whether the RSS voltage is above the maximum value Vmax. If so, the lowest level audible signal indication is given at Block 70. This comparison of the RSS voltage to the predetermined threshold ranges continues such as for the indicated intermediate range (Block 72) which can generate an intermediate level audible signal indication at Block 74. If the RSS voltage is below the lowest threshold, then the highest level audible signal indication is given an Block 76 before stopping (Block 78).

Figure 9:
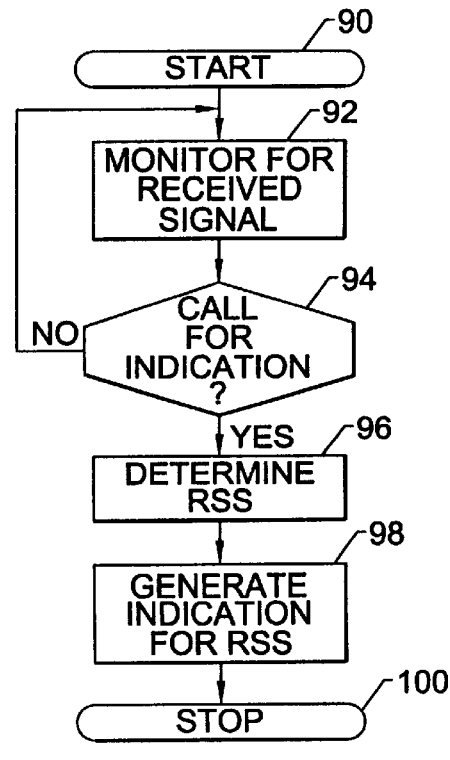
FIG. 9 is a flowchart for a method of a continuous level audible signal indication embodiment of the present invention.

Turning now to the flowchart of FIG. 9, an embodiment of the invention including a continuous level of audible signal indication is described. From the start (Block 90) the receiver 21 is monitored for a received RF signal from the remote transmitter 30 at Block 92. If an RF signal is received and the signal calls for a response from the controller 15 as determined at Block 94, the RSS voltage is determined at Block 96. The audible signal level indication is generated at Block 98 based on the RSS voltage before stopping (Block 100).

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle remote control system comprising:
a remote transmitter to be carried by a user;
a receiver at the vehicle for receiving signals from the remote transmitter, each received signal having a received signal strength corresponding to a transmission distance from said remote transmitter to said receiver;
a controller connected to said receiver and being operable in response to received signals from said remote transmitter; and
an audible signal generator at the vehicle and connected to said controller;
said controller causing said audible signal generator to generate an audible signal having at least one characteristic so that the audible signal is less intrusive for a higher received signal strength corresponding to a shorter transmission distance between said remote transmitter and said receiver.

2. A vehicle remote control system according to claim 1 wherein the at least one characteristic of the audible signal comprises a volume of the audible signal; and wherein the volume is lower for a shorter transmission distance.

3. A vehicle remote control system according to claim 1 wherein the at least one characteristic of the audible signal comprises a duration of the audible signal; and wherein the duration is less for a shorter transmission distance.

4. A vehicle remote control system according to claim 1 wherein the at least one characteristic of the audible signal comprises a frequency of the audible signal; and wherein the frequency is lower for a shorter transmission distance.

5. A vehicle remote control system according to claim 1 said controller causes said audible signal generator to generate the audible signal responsive to receiving the signal from said remote transmitter to thereby serve as confirmation to the user of receipt of the signal from said remote transmitter.

6. A vehicle remote control system according to claim 1 wherein said controller causes said audible signal generator to generate the audible signal responsive to an operation performed by said controller to thereby serve as confirmation to the user of performance of the operation by said controller.

7. A vehicle remote control system according to claim 1 wherein said controller establishes a plurality of discrete values of the at least one characteristic of the audible signal based upon the received signal strength.

8. A vehicle remote control system according to claim 1 wherein said controller permits selection of at least one default value of the at least one characteristic of the audible signal.

9. A vehicle remote control system according to claim 1 wherein said controller is switchable between armed and disarmed modes responsive to respective arm and disarm signals from said remote transmitter.

10. A vehicle remote control system according to claim 1 wherein said controller generates door lock and unlock signals responsive to respective lock and unlock signals from said remote transmitter.

11. A vehicle remote control system according to claim 1 wherein said controller generates an engine start signal responsive to an engine start signal from said remote transmitter.

12. A vehicle remote control system according to claim 1 wherein said audible signal generator comprises at least one of a horn, a siren, and a loudspeaker.

13. A vehicle remote control system according to claim 1 wherein said remote transmitter comprises a radio frequency remote transmitter and said receiver comprises a radio frequency receiver.

14. A vehicle remote control system comprising:
a remote transmitter to be carried by a user;
a receiver at the vehicle for receiving signals from the remote transmitter, each received signal having a received signal strength corresponding to a transmission distance from said remote transmitter to said receiver;
a controller connected to said receiver and being operable in response to received signals from said remote transmitter; and
an audible signal generator at the vehicle and connected to said controller;
said controller causing said audible signal generator to generate an audible signal having a lower volume for a higher received signal strength.

15. A vehicle remote control system according to claim 14 said controller causes said audible signal generator to generate the audible signal responsive to receiving the signal from said remote transmitter to thereby serve as confirmation to the user of receipt of the signal from said remote transmitter.

16. A vehicle remote control system according to claim 14 wherein said controller causes said audible signal generator to generate the audible signal responsive to an operation performed by said controller to thereby serve as confirmation to the user of performance of the operation by said controller.

17. A vehicle remote control system according to claim 14 wherein said controller establishes a plurality of discrete values of the volume of the audible signal based upon the received signal strength.

18. A vehicle remote control system according to claim 14 wherein said controller permits selection of at least one default value of the volume of the audible signal.

19. A vehicle remote control system according to claim 14 wherein said controller is switchable between armed and disarmed modes responsive to respective arm and disarm signals from said remote transmitter.

20. A vehicle remote control system according to claim 14 wherein said controller generates door lock and unlock signals responsive to respective lock and unlock signals from said remote transmitter.

21. A vehicle remote control system according to claim 14 wherein said controller generates an engine start signal responsive to an engine start signal from said remote transmitter.

22. A vehicle remote control system according to claim 14 wherein said audible signal generator comprises at least one of a horn, a siren, and a loudspeaker.

23. A vehicle remote control system according to claim 14 wherein said remote transmitter comprises a radio frequency remote transmitter and said receiver comprises a radio frequency receiver.

24. A vehicle remote control system comprising:
a remote transmitter to be carried by a user;
a receiver at the vehicle for receiving signals from the remote transmitter, each received signal having a received signal strength corresponding to a transmission distance from said remote transmitter to said receiver;
a controller connected to said receiver and being operable in response to received signals from said remote transmitter; and
an audible signal generator at the vehicle and connected to said controller;
said controller causing said audible signal generator to generate an audible signal having a shorter duration for a higher received signal strength.

25. A vehicle remote control system according to claim 24 said controller causes said audible signal generator to generate the audible signal responsive to receiving the signal from said remote transmitter to thereby serve as confirmation to the user of receipt of the signal from said remote transmitter.

26. A vehicle remote control system according to claim 24 wherein said controller causes said audible signal generator to generate the audible signal responsive to an operation performed by said controller to thereby serve as confirmation to the user of performance of the operation by said controller.

27. A vehicle remote control system according to claim 24 wherein said controller establishes a plurality of discrete values of the duration of the audible signal based upon the received signal strength.

28. A vehicle remote control system according to claim 24 wherein said controller permits selection of at least one default value of the duration of the audible signal.

29. A vehicle remote control system according to claim 24 wherein said controller is switchable between armed and disarmed modes responsive to respective arm and disarm signals from said remote transmitter.

30. A vehicle remote control system according to claim 24 wherein said controller generates door lock and unlock signals responsive to respective lock and unlock signals from said remote transmitter.

31. A vehicle remote control system according to claim 24 wherein said controller generates an engine start signal responsive to an engine start signal from said remote transmitter.

32. A vehicle remote control system according to claim 24 wherein said audible signal generator comprises at least one of a horn, a siren, and a loudspeaker.

33. A vehicle remote control system according to claim 24 wherein said remote transmitter comprises a radio frequency remote transmitter and said receiver comprises a radio frequency receiver.

34. A method for operating a vehicle remote control system while reducing the intrusiveness thereof, the vehicle remote control system comprising a remote transmitter to be carried by a user, a receiver at the vehicle for receiving signals from the remote transmitter with each received signal having a received signal strength corresponding to a transmission distance from the remote transmitter to the receiver, a controller connected to the receiver and being operable in response to received signals from the remote transmitter, and an audible signal generator at the vehicle and connected to the controller, the method comprising the steps of:
operating the controller responsive to received signals from the remote transmitter; and
causing the audible signal generator to generate an audible signal having at least one characteristic so that the audible signal is less intrusive for a higher received signal strength corresponding to a shorter transmission distance between the remote transmitter and the receiver.

35. A method according to claim 34 wherein the at least one characteristic comprises a volume of the audible signal so that the step of causing the audible signal generator to generate the audible signal comprises causing the audible signal generator to generate the audible signal so that a volume thereof is lower for a higher received signal strength.

36. A method according to claim 34 wherein the at least one characteristic comprises a duration of the audible signal so that the step of causing the audible signal generator to generate the audible signal comprises causing the audible signal generator to generate the audible signal so that a duration thereof is shorter for a higher received signal strength.

37. A method according to claim 34 wherein the at least one characteristic comprises a frequency of the audible signal so that the step of causing the audible signal generator to generate the audible signal comprises causing the audible signal generator to generate the audible signal so that a frequency thereof is lower for a higher received signal strength.

38. A method according to claim 34 wherein the step of causing generation of the audible signal is performed responsive to receiving the signal from the remote transmitter.

39. A method according to claim 34 wherein the step of causing generation of the audible signal is performed responsive to performance of an operation by the controller.

40. A method according to claim 34 further comprising the step of setting discrete values for the at least one characteristic of the audible signal based upon received signal strength.

41. A method according to claim 34 further comprising the step of selecting at least one default value of the at least one characteristic of the audible signal.

42. A method according to claim 34 wherein the controller is switchable between armed and disarmed modes responsive to respective arm and disarm received signals.

43. A method according to claim 34 wherein the controller generates door lock and unlock signals responsive to respective lock and unlock received signals.

44. A method according to claim 34 wherein the controller generates an engine start signal responsive to an engine start signal received signal.

* * * * *